(12) United States Patent
Coehoorn et al.

(10) Patent No.: US 7,069,568 B2
(45) Date of Patent: Jun. 27, 2006

(54) RECORD HEAD FOR THERMALLY ASSISTED MAGNETIC RECORDING

(75) Inventors: Reinder Coehoorn, Eindhoven (NL); Albert Hendrik Jan Immink, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 268 days.

(21) Appl. No.: 09/881,602

(22) Filed: Jun. 14, 2001

(65) Prior Publication Data

US 2005/0071859 A1 Mar. 31, 2005

(30) Foreign Application Priority Data

Jun. 16, 2000 (EP) .................................. 00202087

(51) Int. Cl.
*G11B 7/08* (2006.01)
(52) U.S. Cl. ..................................................... 720/659
(58) Field of Classification Search ................ 720/659; 369/13.13, 13.14, 13.17, 13.32, 13.33; 360/313, 360/317

See application file for complete search history.

(56) References Cited

U.S. PATENT DOCUMENTS

| | | | | |
|---|---|---|---|---|
| 5,317,800 A | | 6/1994 | Fedeli et al. .................. 29/603 |
| 5,440,530 A | * | 8/1995 | Fedeli et al. .............. 369/13.32 |
| 6,016,290 A | * | 1/2000 | Chen et al. ................ 369/13.17 |
| 6,404,706 B1 | * | 6/2002 | Stovall et al. ............ 369/13.17 |
| 6,674,693 B1 | * | 1/2004 | Awano et al. ............. 369/13.14 |
| 6,762,977 B1 | * | 7/2004 | Gage et al. ................ 369/13.13 |
| 6,771,462 B1 | * | 8/2004 | Khizroev et al. ............ 360/122 |
| 6,809,908 B1 | * | 10/2004 | Ito et al. ...................... 360/317 |
| 6,873,576 B1 | * | 3/2005 | Van Kesteren ........... 369/13.17 |

FOREIGN PATENT DOCUMENTS

WO   WO9935643   7/1999

* cited by examiner

*Primary Examiner*—Allen Cao

(74) *Attorney, Agent, or Firm*—Michael E Belk

(57) ABSTRACT

A record head for the thermally assisted magnetic recording on a storage medium. The head has an inductive section, which includes a magnetic circuit having a record flux guide ending in a record pole, and an optical section, which includes an optical guide ending in an optical outlet. The optical guide is arranged beside the magnetic circuit and is an optical layer transparent to a selected wavelength. The optical layer is interposed between two cladding layers, of which one is formed by the record flux guide of the magnetic circuit and the other is formed by a layer having an index of refraction smaller than the index of refraction of the optical layer. The record head makes it possible to minimize the time that elapse between the moment of maximal energy absorption in the medium and the moment of recording on the medium in a thermally assisted recording process.

9 Claims, 1 Drawing Sheet

RECORD HEAD FOR THERMALLY ASSISTED MAGNETIC RECORDING

Figure 1:
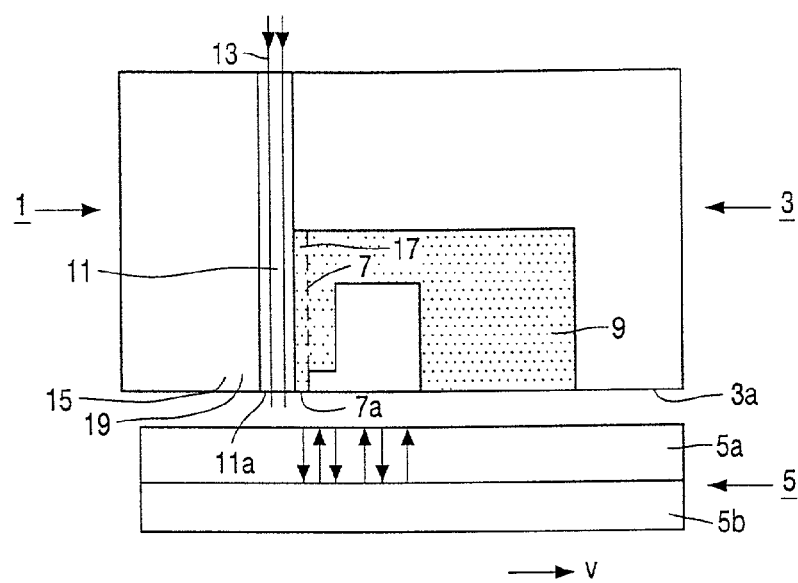

The invention relates to a record head for the thermally assisted magnetic recording on a storage medium, which head has a head face and comprises an inductive section, which includes a magnetic circuit having a record flux guide ending in a record pole, and an optical section, which includes an optical guide ending in an optical outlet in the head face, the optical guide being arranged beside the magnetic circuit and being an optical layer transparent to a given wavelength, the optical layer being interposed between two cladding layers having an index of refraction whose real part is smaller less than the real part of the index of refraction of the optical layer.

an embodiment of such a head is known from U.S. Pat. No. 5,317,800, which document discloses an integrated magneto-optical read and write head for cooperation with a recording medium of a magneto-optical material. Such a medium is capable of storing, in the form of magnetic domains, binary data corresponding to the orientation of the magnetization of the material. The medium used is suitable for perpendicular magnetic recording. Under the influence of an external magnetic field said domains are oriented in the same direction as the external magnetic field if this field exceeds the coercivity of the magneto-optical material. For a domain oriented in a certain position a suitable external field can switch this domain to an opposite direction. To control the switching of the magnetization the magneto-optical material is such that its coercivity decreases when the temperature increases from the ambient temperature to a certain value. The known magneto-optical head has an optical subassembly for heating a zone of the medium so as to enable the magnetization in this zone to be switched. The known head further has a magnetic subassembly for generating a switching field. The optical subassembly comprises an optical guide formed by an optical layer interposed between two transparent layers having an index of refraction smaller than that of the optical guide. The optical layer as well as said two layers are transparent to light of certain wavelengths. The magnetic subassembly comprises a magnetic circuit having a lower pole part and an upper pole part. The lower pole part adjoins one of said transparent layers and ends in a final pole set back relative to the optical outlet of the optical guide and positioned at a relatively large longitudinal distance from this optical output, which distance is mainly determined by thickness of the transparent layer adjacent to the lower pole part. The known head should provide such a magnetic field that the ratio between the perpendicular component of the magnetic field below the pole and the perpendicular component of the magnetic field below the optical output is relatively small.

Hybrid recording is a form of thermally assisted magnetic recording, a laser spot being usually used for locally heating a storage medium, followed by recording and subsequent fast cooling. This kind of recording allows the use of storage media having a relatively high magnetic anisotropy at room temperature and hence having a good thermal stability, whereas the coercivity and thus the anisotropy at the record temperature is sufficiently small for recording with realizable record heads. A gain in areal bit density is obtainable with respect to conventional longitudinal magnetic recording; however, this gain highly depends on the cooling time after recording. For an appropriately designed system this may be estimated as being of the order of the time between heating and recording, here referred to as the delay time $t=d/v$, wherein d is the longitudinal distance between the optical outlet and the record pole and v is the linear velocity of the storage medium. This can be understood as follows. The maximum possible areal bit density decreases with increasing cooling time after recording. This is the time in between the moment of writing and the moment at which the temperature has decreased to a value at which the coercivity and the magnetic anisotropy of the storage medium are sufficiently large to ensure the thermal stability of a written magnetization pattern on the medium. This time may be reader by increasing the effective thermal diffusibility of the medium. However, if this would result in a cooling time much shorter than the time between heating and writing, cooling being already significant between heating and writing. This effect would require a relatively high heating temperature, notably a temperature which is significantly higher than the temperature of the medium during writing. A high heating temperature may, however, in practice cause an overheating of the medium, resulting in an enhanced thermal relaxation of the bit pattern on neighboring tracks. Moreover, such a process requires much energy. From the foregoing it will be clear that the maximum possible areal bit density may be increased by decreasing the delay time. In this context, it is to be noted that, generally, the moment at which the medium has attained the maximum temperature occurs after the moment of maximum energy absorption. This effect becomes significant if the so-called Péclet number $Pe \equiv Lv/2D \geq 1$, where L is the optical spot dimension— full width at half maximum—measured in the track length direction, v is the linear velocity of the storage medium and D is the effective thermal diffusibility of the medium. However, under practical conditions $Pe \leq 1$, and the distance between the position of maximum temperature and the position of maximum energy absorption is much smaller than L.

It is an object of the invention to provide a record head of the kind described in the opening paragraph, by means of which it is possible in a thermally assisted recording process to minimize the time that elapses between the moment of maximum energy absorption in a storage medium and the moment of recording on the medium.

This object is achieved with the record head according to the invention which is characterized in that one of the cladding layers is formed by the record flux guide of the magnetic circuit and/or a metal layer interposed between the optical layer and the record flux guide. Due to this measure the optical outlet and the record pole are very close to each other in the head according to the invention, so that the time between heating a zone of the medium and recording information into the heated zone is very short in a recording process using the head according to the invention. The head according to the invention is particularly suitable for thermally assisted perpendicular magnetic recording, in which case the thickness of the record pole, seen in a longitudinal direction, i.e. parallel to the head face and in the track length direction of the medium, can be close to the shortest distance between the transitions between the bits on the medium. The thickness of the record pole may be e.g. only 40 nm and less in the case of a recording density of 100 Gbit/in$^2$ and higher. If the linear velocity of the storage medium is in the order of 20 to 50 m/s this leads to a delay time of the order of 0.8 to 2 ns. Assuming that a record system using the head according to the invention is well designed, i.e. the effective cooling time after recording is of the same order of magnitude as the delay time, hybrid perpendicular recording can result in a considerable areal density increase. A density gain of a factor 5 to 6 with respect to conventional longitudinal magnetic recording is obtainable.

If a metal layer between the optical layer and the record flux guide is applied as cladding layer, the thickness of the metal layer is preferably less than 100 nm. Preferably, the real part of the refractive index is smaller than 0.5 for the wavelength employed. A suitable metal for the metal layer is e.g. silver or aluminum. The metal layer may be in direct contact with the optical layer or a sublayer, such as an adhesion layer, may be used. If no metal layer is used the record flux guide may be in direct or indirect contact with the optical layer. In case of said metal layer having a refractive index whose real part is smaller than 0.5 for the wavelength employed, it has been found that for one of the optical modes of the optical guide, the so-called TM0-mode, a very large fraction of the optical power is transmitted through the low refractive index layer, i.e. the metal layer. This leads to a shorter effective delay time than would be possible in the absence of such a layer. Additional advantages are that the direct optical excitation of the flux guide material can be varied by varying the thickness of the metal layer, and that the temperature of the flux guide can be controlled well in the case that the metal layer is made of a good thermal conductor, such as Ag or Al.

In the record head according to the invention both the record pole and the optical outlet are preferably disposed in the head face. This configuration is particularly essential in case of storage media having a soft-magnetic sublayer. Arranging the record pole in the head face minimizes the distance between the record pole and the soft-magnetic sublayer and thereby minimizes the magnetic field gradient of the trailing edge of the record pole where writing takes place. This leads to very narrow transitions between successive writing domains.

The cladding layer formed by the record flux guide of the magnetic circuit is a magnetic layer, in general a metallic layer. The cladding layer not formed by the record flux guide may be a layer or a substrate of a dielectric material having an index of refraction smaller than that of the transparent material of the optical layer. Such a dielectric material is e.g. $SiO_2$.

It is to be noted that a known read/write head for use in a magneto-optical data storage system to enable hybrid transduction of data is disclosed in the PCT Application WO 99/35643. This known head has a magnetic yoke and an optical channel. The magnetic yoke includes two pole layers of substantially the same thickness, the pole layers defining a non-metallic write gap. The optical channel is formed within the magnetic yoke, i.e. between the two pole layers, and extends along one of said pole layers, particularly the optical channel is formed within the write gap. Although a short delay time between heating a record zone of the storage medium and recording could be realized, this known head is quite inefficient as to the transmission of light through the write gap if areal densities of 100 Gbit/sn$^2$ and beyond are required. In the case of such high densities the gap length, i.e. the dimension of the write gap seen in the direction of velocity of the storage medium with regard to the head, should be of the order of 100 nm and below, which is, as an example, a factor 4 below the 400 nm wavelength of the light from a blue laser, whereas the gap width, i.e. the dimension of the write gap perpendicular to the gap length, should be below 160 nm. Hence, the aperture available for passing light is small.

An embodiment of the record head according to the invention is characterized in that the cladding layer formed by the record flux guide and/or the metal layer is a thin-film layer. Such a layer may be formed by means of available thin-film technology. A suitable magnetic material for the record flux guide is e.g. an Ni—Fe alloy, such as $Ni_{80}Fe_{20}$, or $Ni_{45}Fe_{55}$. The optical layer itself and the other cladding layer are preferably thin-film layers, too. The optical layer is formed from a transparent material, such as $Si_3N_4$; the last-mentioned cladding layer may be formed from a dielectric material, such as $SiO_2$, having an index of refraction smaller than that of the transparent material of the optical layer.

An embodiment of the record head according to the invention is characterized as defined in claim 3.

The use of the record flux guide as a cladding layer on the optical guide may give rise to heating of this flux guide. This unexpected effect of heating the flux guide during use is advantageous for the following reason. The write field from presently used write heads differs from the ultimate write field which could be obtained if a write flux guide of a material with the highest known saturation magnetization Ms could be used. This saturation magnetization is equal to about 1900 kA/m for an $Fe_{65}Co_{35}$ alloy. In the present heads the flux guides have a saturation magnetization of typically only 1200 kA/m. The maximum areal density is proportional to $Ms^{4/3}$, so a maximum density improvement by a factor 1.8 is possible. A drawback of—known—magnetic materials with a relatively high saturation magnetization is that their magnetic anisotropy (and magnetostriction) are far too high for practical use in write heads. It is known per se that for many materials the magnetic anisotropy strongly decreases with increasing temperature, while the saturation magnetization is hardly affected by a rise of temperature if the Curie temperature is sufficiently high. This is the case, for example, for so-called nano-Fe-type soft magnetic materials, for which the effective anisotropy is proportional to $K^{2.5}$, where K is the real anisotropy. These material have randomly oriented crystalline grains, which are magnetically coupled by exchange interaction across the grain boundaries and which have an average grain diameter that is smaller than the magnetic domain wall thickness for single-crystalline materials of the same composition. At 100–200° C. the anisotropy of the above-described materials may be several tens of percents lower than at room temperature, whereas the saturation magnetization is hardly decreases. The record head according to the invention makes it possible, due to heating of the record flux guide, to introduce magnetic flux guide materials with a saturation magnetization close to the ultimate physical limit. In this context it is noted that the record flux guide or a part of it may be made of a magnetic material different from the magnetic material of the rest of the magnetic circuit.

An embodiment of the record head according to the invention is characterized as defined in claim 5.

The invention further relates to a slider including the record head according to the invention.

The invention further relates to a system for the magnetic recording, particularly perpendicular recording, of information into a storage medium, the system including the record head according to the invention on the slider according to the invention. The system may be an audio, video, on data storage system. The storage medium may be a disc. If desired, the system may comprise a read device for reading information from the storage medium.

With reference to the Claims, it is noted that various characteristic features as defined in the set of Claims may occur in combination.

The above-mentioned and other aspects of the invention are apparent from and will be elucidated, by way of non-limitative example, with reference to the embodiments described hereinafter.

Figure 2:
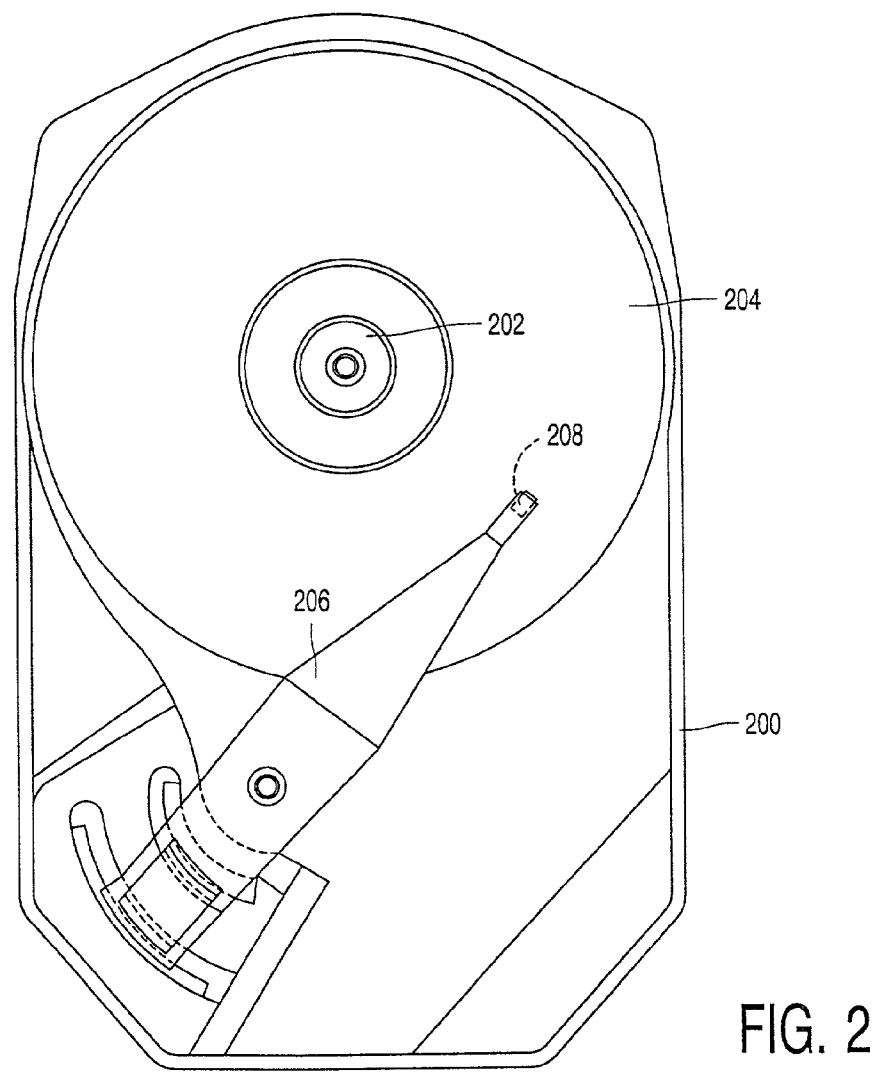

In the drawing:

FIG. 1 is a diagrammatic cross-sectional view of an embodiment of the slider according to the invention, and FIG. 2 shows diagrammatically an embodiment of the system according to the invention.

The slider 1 shown in FIG. 1 includes an integrated record head 3 according to the invention intended for the thermally assisted perpendicular magnetic recording on a storage medium 5. Such a medium has a recording layer 5a in which information can be recorded perpendicularly, and a soft-magnetic sublayer 5b. During recording the medium 5 moves with a linear velocity v with respect to the record head 3. The record head 3 has a head face 3a and has an inductive section, which includes a magnetic circuit in the form of a magnetic yoke formed of a metallic material, such as $Ni_{45}Fe_{55}$. This yoke has a record flux guide 7 and a return flux guide 9, the record flux guide 7 ending in a record pole 7a. The record head 3 further has an optical section, which includes a planar optical guide formed by an optical layer 11 ending in an optical outlet 11a. The optical layer 11 is transparent to one or, if desired, several selected wavelengths. In this embodiment the optical layer 11 is a thin-film layer made of $Si_3N_4$ and is transparent to light 13 of a wavelength of 400 nm. The optical layer 11 is interposed between the record flux guide 7 and a substrate 15 of the slider 1 in such a way that the record flux guide 7 and the substrate 15 each form a cladding layer 17 and 19, respectively, on the optical layer 11. This means that the cladding layer 17 formed by the record flux guide 7 is a magnetic, in particular metallic, layer. Such a layer is practically non-transparent. The substrate 15 is made of a dielectric material, in this embodiment $SiO_2$, having such properties that the cladding layer 19 formed by the substrate 15 has an index of refraction smaller than the index of refraction of the optical layer 11. In this embodiment the cladding layer 17 has been formed by means of a thin-film technology, and consists of a magnetic material, such as an alloy of Fe and N, which has a higher saturation magnetization than the magnetic material of the rest of the magnetic yoke. The magnetic pole 7a, like the optical outlet 11a, is situated in the head face 3a. The magnetic pole and the optical outlet have been shaped by a Focus-Ion-Beam process; this measure ensures excellent alignment of the optical spot and the write field during use.

In an alternative embodiment a metal layer is interposed between the optical layer 11 and the record flux guide 7, which metal layer may be formed of a metal, such as Ag, having a refractive index whose real part is smaller than 0.5 for the wavelength employed.

The system according to the invention shown in FIG. 2 includes a frame 200 and a spindle 202 rotatably mounted in the frame 200, for carrying a storage medium, particularly a disc-like information carrier 204, such as a magneto-optical disc. The information carrier 204 may be an integrated carrier or a removable carrier. The system further includes a laser source and a swing-arm 206 carrying a slider with a record head 208 according to the invention. The slider with the record head may be designed as shown in FIG. 1. Drives are provided for driving the spindle 202 and the arm 206. In an operational state the record head 208 generates a write field for the thermally assisted recording of information on the rotating information carrier 204, the head being disposed opposite to the information carrier 204 and moving substantially radially with respect to the carrier 204. The system may include a read device, such as an inductive head. The system shown is a data storage system but may be, for example, an audio and/or video system. The system according to the invention may also be a system for reading information from a card or tape.

Finally, it is noted that an essential feature of the record head according to the invention is that the distance between the optical outlet and the magnetic pole is extremely small, giving the opportunities as described in the foregoing. Of course, modifications of the disclosed concept are possible within the scope of the invention.

The invention claimed is:

1. A record head for the thermally assisted magnetic recording on a storage medium, which said head has a head face and comprises an inductive section, which includes a magnetic circuit having a record flux guide ending in a record pole, and an optical section, which includes an optical guide ending in an optical outlet in the head face, the optical guide being arranged beside the magnetic circuit and being an optical layer transparent to a given wavelength, the optical layer being interposed between two cladding layers having an index of refraction whose real part is smaller than the real part of the index of refraction of the optical layer, characterized in that one of the cladding layers is formed by the record flux guide of the magnetic circuit and/or a metal layer interposed between the optical layer and the record flux guide.

2. A record head according to claim 1, characterized in that the cladding layer formed by the record flux guide and/or the mutual layer is a thin-film magnetic layer.

3. A record head according to claim 1, characterized in that the cladding layer formed by the record flux guide is made of a magnetic material which has a higher saturation magnetization than the magnetic material of the other parts the magnetic circuit.

4. A record head according to claim 1, characterized in that both the record pole and the optical outlet are disposed in the head face.

5. A record head according to claim 1, characterized in that the magnetic circuit has a return flux guide, the thickness of the record flux guide being substantially smaller than the thickness of the return flux guide.

6. A slider including the record head according to claim 5.

7. A system for the magnetic recording of information into a storage medium, the system including the record head according to claims 1.

8. A system according to claim 7, including a read device for reading information from the storage medium.

9. A system according to claim 7, the system being a system for perpendicular magnetic recording.

* * * * *